United States Patent
Schultze et al.

(10) Patent No.: US 8,144,700 B2
(45) Date of Patent: Mar. 27, 2012

(54) METHOD OF OPERATING A NETWORK UTILIZING DATA TELEGRAMS BETWEEN PRIMARY AND SECONDARY STATIONS

(75) Inventors: Stephan Schultze, Lohr am Main (DE); Alexander Tchekler, Neustadt (DE); Roland Ackermann, Lohr-Steinweg (DE); Gerald Noack, Lohr (DE)

(73) Assignee: Robert Bosch GmbH, Stuttgart (DE)

( * ) Notice: Subject to any disclaimer, the term of this patent is extended or adjusted under 35 U.S.C. 154(b) by 477 days.

(21) Appl. No.: 11/672,819

(22) Filed: Feb. 8, 2007

(65) Prior Publication Data

US 2007/0189287 A1 Aug. 16, 2007

(30) Foreign Application Priority Data

Feb. 10, 2006 (DE) .................... 10 2006 006 509

(51) Int. Cl.
*H04L 12/56* (2006.01)
*G06F 15/16* (2006.01)
*H04J 3/02* (2006.01)
(52) U.S. Cl. .............. 370/389; 370/503; 709/203
(58) Field of Classification Search ............ None
See application file for complete search history.

(56) References Cited

U.S. PATENT DOCUMENTS

| 7,162,510 | B2* | 1/2007 | Jammes | 709/203 |
|---|---|---|---|---|
| 7,356,617 | B2* | 4/2008 | Suzuki et al. | 709/248 |
| 2002/0018458 | A1* | 2/2002 | Aiello et al. | 370/348 |
| 2002/0194365 | A1* | 12/2002 | Jammes | 709/237 |
| 2005/0041690 | A1* | 2/2005 | Arnold et al. | 370/493 |
| 2005/0114577 | A1* | 5/2005 | Beckhoff et al. | 710/110 |
| 2005/0201420 | A1* | 9/2005 | Bhandari et al. | 370/508 |
| 2006/0092858 | A1* | 5/2006 | Kynast et al. | 370/254 |
| 2006/0136604 | A1* | 6/2006 | Schultze et al. | 709/251 |
| 2008/0002737 | A1* | 1/2008 | Schwenkel et al. | 370/463 |

FOREIGN PATENT DOCUMENTS

| DE | 199 35 490 | 2/2001 |
|---|---|---|
| DE | 103 45 816 | 5/2005 |
| DE | 10 2004 063 213 | 7/2006 |

* cited by examiner

*Primary Examiner* — Marcus R Smith
(74) *Attorney, Agent, or Firm* — Michael J. Striker

(57) ABSTRACT

In a method for operating a network having a primary station and at least two secondary stations, the primary station communicates with the secondary stations. The secondary stations communicate with one another via cross communication in the form of telegrams which are generated in the context of communications cycles.

12 Claims, 2 Drawing Sheets

METHOD OF OPERATING A NETWORK UTILIZING DATA TELEGRAMS BETWEEN PRIMARY AND SECONDARY STATIONS

CROSS-REFERENCE TO A RELATED APPLICATION

The invention described and claimed hereinbelow is also described in German Patent Application DE 10 2006 006 509.3 filed on Feb. 10, 2007. This German Patent Application, whose subject matter is incorporated here by reference, provides the basis for a claim of priority of invention under 35 U.S.C. 119(a)-(d).

BACKGROUND OF THE INVENTION

The invention relates to methods for operating a network and to networks embodied accordingly.

The significance of networks or network services has increased constantly in recent years. Besides their well-known use as a communications platform, such as the internet, their use in the industrial field is also of increasing significance, for instance in linked-together control or automation systems.

Especially in industrial applications, a reliable network connection among the individual participants that is as effective as possible, or in other words is fast and reliable, is of extreme importance, so as to avoid problems or even failures in production. To assure the most effective possible communication, the amount of data that must be exchanged or transmitted in the context of the communication must be as low as possible.

A communications system specified by ODVA and known by the name CPIsync employs clock time synchronization in all the secondary stations of a network that has a primary station and secondary stations. The system has a primary station and secondary stations. In addition to communication between the primary station and secondary stations, communication between secondary stations (so-called cross communication) is also provided. If one secondary station sends data to a further secondary station, it adds a time statement in the form of a clock time to the data to be transmitted; this time indicates when the transmitted data were refreshed. Data pertaining to a refreshment cycle time are also added. The receiver must always expect that the refreshment cycle time can change. Moreover, such communication is not limited to a fixed, constant cycle time. As a result, besides the actual data, further additional data must be transmitted, making the overall data transmission quite inefficient. Moreover, the receiver (consumer) of the particular data transmitted must keep an appropriate computation power available so that it can manage the change in cycle times.

Another communication method is known by the name SERCOS III. This communications system for networks which have a primary station and secondary stations does not, however, specify cross communication or in other words communication between the secondary stations. From this communications system, only communication between the primary station and the various secondary stations is contemplated. This communication plan proves to be relatively slow for certain applications.

In communication between the primary station and the secondary stations, a mechanism is specified in which the data refreshment rate of the transmitted data is specified by the primary station. In this connection, besides the communications cycle time, there is a so-called NC cycle time, which describes the cycle time with which the primary station refreshes its data to the secondary stations. Besides these two cycle times, there is a refreshment signaling in the data telegram from the primary station to each secondary station, in which the primary station signals when its transmitted data were refreshed (so-called "IPO sync bit"). From the refreshment signaling, the secondary stations can optimize their regulation and control algorithms and synchronize them with the NC cycle time.

For assuring reliable communication, the methods and systems described require a relatively large amount of time, which makes it difficult or impossible to use them in systems that require very fast connections, such as real-time systems.

SUMMARY OF THE INVENTION

The methods of the invention make very fast, effective communication possible in networks that have a primary station and at least two secondary stations. The direct communication contemplated between individual secondary stations (cross communication) contributes to this. Since for the communication between secondary stations, data transmission telegrams, or simply telegrams, generated by the primary station are employed, the data structure can be kept quite simple, making fast and effective communication possible.

The telegrams employed according to the invention can be generated especially preferably by the primary station and/or at least one of the secondary stations. As a rule, generation of the telegrams by the primary station makes an especially simple, uniform communication structure possible. On the other hand, generation of telegrams by at least one of the secondary stations, in the event of a (partial) failure of the primary station, makes it possible for telegrams to continue to be generated to keep the communication going.

In a preferred embodiment of the method of the invention, the cross-communication data are each transmitted in their own data telegrams. For a specific cross communication, that is, a communication between two specified secondary stations, their own telegrams do exist. These telegrams can be generated by the primary station and/or by one of the secondary stations.

However, it is preferable that the cross-communication data be transmitted in a common data telegram with the cross-communication data between the primary station and the at least two secondary stations, or in a common data telegram which contains only cross-communication data from a plurality of secondary stations or from all of the secondary stations. This kind of combination of cross-communication data in one telegram proves advantageous, particularly in the event of an error, such as an interruption in a line connecting the stations. In such a case, between specified secondary stations, for instance, direct communication is no longer possible. In this case, communication must be done via the primary station. To that end, the primary station must be operated in a mode in which data are transmitted from a first port to a second port, for instance by means of recopying. In a common telegram, recopying data is easier, since the data can be copied in blocks, and individual telegrams need not be copied. In particular, the data here need not be looked for in a "mixed telegram" that for instance does not exclusively contain cross-communication data. In this case, it is conceivable to furnish an especially suitable hardware support for recopying data.

It proves to especially advantageous that the cross-communication data are jointly transmitted in the context of an existing data telegram. This advantageously means telegrams which are used for communication between the primary station and the secondary stations, or between the secondary stations and the primary station. Such telegrams are used for instance in ipanet applications.

In an especially preferred embodiment of the method of the invention and of the network of the invention, the cross-communication connections are embodied as logical point-to-point connections. With this provision, in which signal paths in communication between two secondary stations are optionally directed over further secondary stations, a direct communication between secondary stations is possible without requiring that explicit or direct wiring exist between these secondary stations.

The embodiment of the network of the invention such that the cross-communication connections are or include logic connections from one point (that is, one secondary station) to a plurality of points (that is, a plurality of other secondary stations) proves to be especially advantageous. This kind of communication is also known as "multicast communication"; that is, one secondary station acting as a producer supplies a number of secondary stations, acting as consumers, with data.

In an especially preferred embodiment of the method of the invention, for which separate patent protection is sought, a refreshment of the cross-communication data is signaled in the context of the communication between the secondary stations. This can be accomplished for instance by providing that a data telegram or communication telegram has a corresponding piece of information for one or more secondary stations. This provision makes it possible to overcome one of the substantial disadvantages of the prior art, which is that conventionally, the producer cycle time, or in other words the frequency with which a secondary station generates a datum, is in fact equal to the communications cycle time. With the provision described, it is for instance possible for refreshment of a cross-communication datum to be done only after each nth communications cycle. Signaling such a refreshment operation makes it possible to assure that a consumer, or in other words a secondary station, for which the cross communication datum is intended, will become active for receiving the cross communication datum only for those telegrams in which a refreshment of this datum is indicated or signaled.

Preferably, the signaling of the refreshment of the cross-communication data is performed by the secondary station that produces these data. This provision proves especially effective, since signaling of a refreshment of cross-communication data can be imparted to a further secondary station for instance, without the primary station having to be involved.

Expediently, this kind of signaling is done in the context of an administration field of the telegram employed.

It proves especially expedient to perform the signaling of the refreshment operation by means of an alternating bit or so-called toggle bit.

It is equally conceivable to perform the signaling of the refreshment by means of a one- or multiple-bit counter. With these provisions, reliable signaling of refreshment of a datum intended for a secondary station can be furnished.

The signaling of the refreshment is advantageously set individually for each data field produced. As a result, it is possible to implement various producer cycle times within one secondary station. For instance, one secondary station, which generates data for further secondary stations, can implement and signal individual refreshment cycles for these secondary stations.

Expediently, the cross-communication data comprise one or more individual values. With cross-communication data structured in this way, especially effective communication can be implemented.

It proves advantageous if the consuming secondary stations know the refreshment cycle time and/or the refreshment times of the cross-communication data produced. In this case, optionally after an initial synchronization of the various secondary stations or of the primary station, signaling of the refreshment can for instance be dispensed with. The knowledge of the cycle time serves for instance to perform internal processing operations, such as an interpolation (fine interpolation) or an extrapolation. This kind of fine interpolation represents a typical use of an IPO sync bit.

It proves especially advantageous if each of the consuming secondary stations optimizes its data processing of the produced data received with regard to the signaled or known refreshment time.

A refreshment cycle time is expediently a multiple of the communications cycle time. Thus the chronological processing of cross-communication data, in particular, can be optimized.

It is preferable in this respect that the communications cycle time be the largest common divisor of the various refreshment cycle times. Preferred technologies on which the method and the network of the invention are based are ethernet technology and SERCOS III technology. Particularly with such technologies, the methods of the invention and networks designed according to the invention are usable for real-time communication.

Preferred applications of the invention are communication in automation systems and communication between controllers.

The invention and its advantages will be described in further detail below in conjunction with the accompanying drawings.

DESCRIPTION OF THE PREFERRED EMBODIMENTS

Figure 1A:
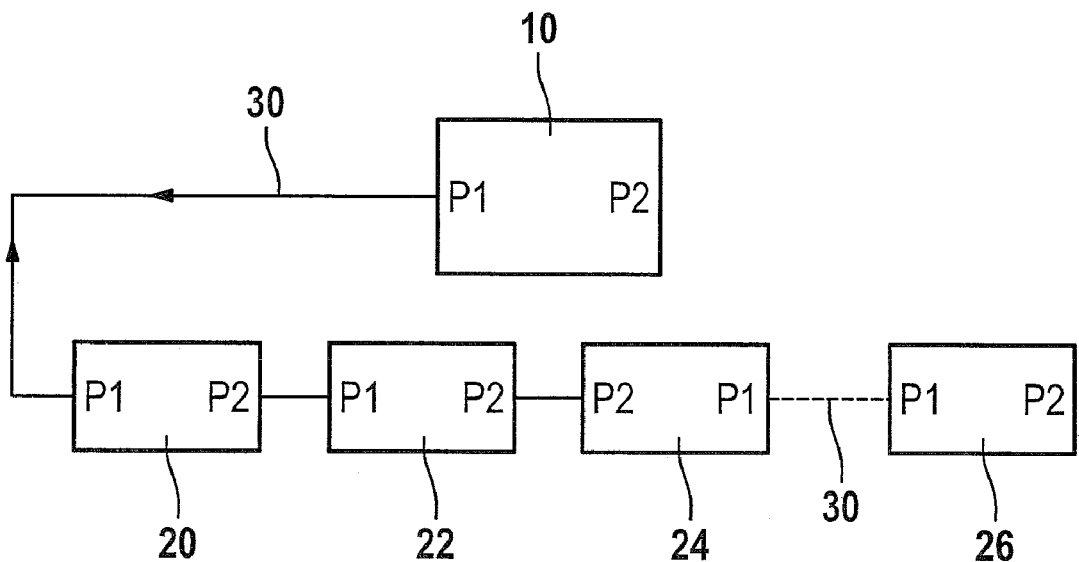
FIGS. 1a, 1b show two different topologies with which a preferred embodiment of a method of the invention and a network of the invention can advantageously be implemented.

FIG. 1a shows a network with a linear structure. The network has a primary station (master) 10 and a number of secondary stations (slaves) 20, 22, 24, 26. The number of secondary stations shown is selected purely as an example. Typically, such networks have a larger number of secondary stations.

A communication takes place between the primary station 10 and the various secondary stations 20 through 26. A cross communication, that is, a communication of the secondary stations with one another, also takes place between the secondary stations 20 through 26. The communication takes place in both directions, that is, away from the primary station 10 and to it, via a line 30. The communication via the single line 30 is done by means of telegrams, which in the structure shown are generated by the primary station and successively reach the secondary stations. The line 30 is preferably embodied as an ethernet cable. Such telegrams, as is widely known, as a rule have at least one header as well as data fields for data to be transmitted. In a preferred embodiment, the telegrams are ethernet telegrams. For the communication between the primary station 10 and the secondary stations 20 through 26, it is possible to transmit data from the primary station for the secondary station in a separate telegram. The same is correspondingly true for data from the secondary stations to the primary station, which can also be transmitted in a separate telegram. In the case of this latter telegram, each secondary station inserts its data into a data field, intended for it, in the telegram.

The secondary station 26, in the linear structure shown, is embodied with a data transmission mirroring device, so that telegrams (generated by the primary station) arriving at the secondary station 26 can be transmitted back to the primary station 10 in the opposite direction via the data transmission line 30.

In addition to the communication between the primary station 10 and the secondary stations 20 through 26, cross communication among the secondary stations is provided for in the invention. The cross-communication data, which one of the secondary stations for instance produces for at least one further secondary station of the secondary stations, can expediently be inserted into data fields, intended for them, in the aforementioned telegrams that are generated by the primary station.

As noted, the communication-takes place in the context of a communications cycle. The communications cycle includes the set of telegrams that are generated or received back by the primary station during one communications cycle time or communication period. The telegrams can include both telegrams ("MDTs") in which data are transmitted from the primary station to the secondary stations, and telegrams ("ATs") in which data are transmitted from the secondary stations to the primary station. These two types of telegrams can also be combined into a single type of telegram.

The data produced by one secondary station and intended for a further secondary station can be inserted into all the types of telegram mentioned. Since refreshment cycles for data transmitted from the primary station to a secondary station or vice versa, or from one secondary station to a further secondary station, are typically longer than the communications cycle time, it is possible for a plurality of successive telegrams in successive communications cycles to contain the same data. To facilitate data processing by a given receiver, that is, the primary station or one of the secondary stations, it is provided according to the invention that a telegram in which there is a change or refreshment of a datum includes signaling accordingly for the receiver. Thus the receiver is put enabled for instance to have to become active only if it is informed of this kind of signaling. A specific embodiment of such telegrams including the signaling operations mentioned will be explained with reference to the further topology shown in FIG. 1b.

Figure 1B:
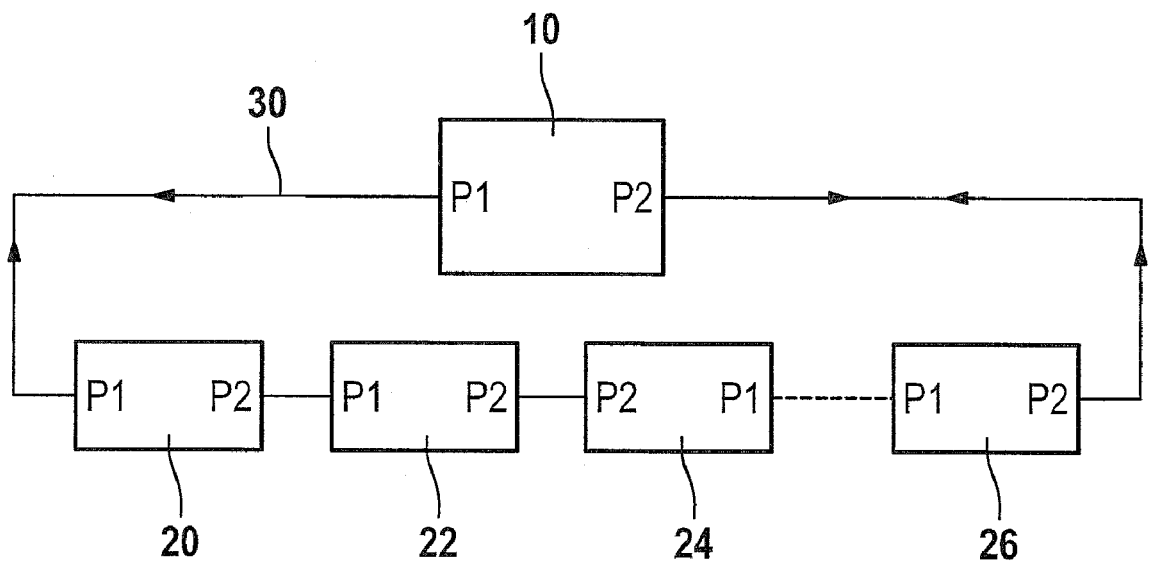

A preferred embodiment of the method of the invention will now be described in conjunction with the topology shown in FIG. 1b. This has a ring structure, of the kind implemented for instance in the SERCOS III communications system. The SERCOS III communications system has a bidirectional double ring; that is, the ports P1 and P2 serve as both an input and an output port.

The corresponding single line for connecting the primary station and secondary stations is again identified by reference numeral 30. The primary station is again identified by reference numeral 10 and the secondary stations by reference numerals 20 through 26. The signal flow directions inside the line 30 are marked by arrows. The line 30 is expediently embodied as a full duplex cable, as is usual in the field of the ethernet.

Here again, the communication takes place cyclically in communications cycles. The length of time between the beginnings of two communications cycles, that is, for instance the first of a group of telegrams, is called the communications cycle time. In this embodiment, one communications cycle includes at least one MDT and one AT. As shown in FIG. 1, the telegrams are first sent to the secondary station 20, which forwards them in the signal flow direction to the next secondary station, in this case secondary station 22, and so forth. In the case of telegrams of the MDT type, the secondary stations each receive the data particularly intended for them. The secondary stations here act as so-called consumers. In the case of telegrams of the AT type, data that are produced by a secondary station are transmitted to the primary station. Corresponding telegrams, given the ring structure shown, can first be sent to the secondary station 26 and forwarded onward from there in the reverse direction.

It is especially preferred that the data which are to be transmitted from one secondary station to a further secondary station be transmitted in the context of type AT telegrams. This will be described in further detail hereinafter, in conjunction with FIG. 2.

The primary station 10 sends and receives data (in the form of telegrams), but does not directly forward any data. Thus a double ring structure that has two data transmission directions is necessary, if it is to be assured that each secondary station be capable of transmitting data to each further secondary station.

In an abstract sense, the topology of the communication, or in other words in this case the ring structure, is not of major importance, since only the cyclical communication in communications cycles is essential. The communications cycles here are expediently strictly chronologically cyclical and have a constant communications cycle time in operation.

According to the invention, the secondary stations can, as noted, communicate directly with one another. Each secondary station thus has one signal path to each other secondary station. As shown in FIG. 1b, this can be implemented for instance by providing that the signal paths (via the single line 30) are formed via further secondary stations, which then forward the data onward. Abstractly, the communication is represented by a data transmission coupling of any kind among the secondary stations.

The secondary-stations can be embodied as either generators or producers of a piece of information (producers) and users (consumers) of a piece of information.

It proves expedient that within one data transmission telegram generated by the primary station 10, particularly a telegram of the AT type, a plurality of pieces of information produced by secondary stations are contained; that is, a plurality of direct communication connections between secondary stations can be transmitted in one telegram.

As noted, the communication takes place in communications cycles with the aid of data transmission telegrams. These cycles may for instance, as in the case of the SERCOS III communications system, have a constant construction with regard to the chronological sequence of the data telegrams to be exchanged.

The cycle time of the communication is not necessarily the same as the refreshment rate of the data telegram contents to be exchanged, in particular the data telegram contents that one of the secondary stations, as a producer, generates for a further one of the secondary stations, as a consumer (so-called producer cycle time). For instance, the communications cycle time can be one millisecond, but a refreshment rate of a datum to be exchanged (producer cycle time) can amount to 4 milliseconds.

A receiver (consumer) of such a datum, such as one of the secondary stations 20 through 26, does not initially know the time when a value sent from another secondary station, or from the primary station (producer), was refreshed.

Abstractly, this is a data transmission with a longer cycle time than the communications cycle time. The data refreshment cycle time is necessarily an integral multiple of the communications cycle time.

Figure 2:
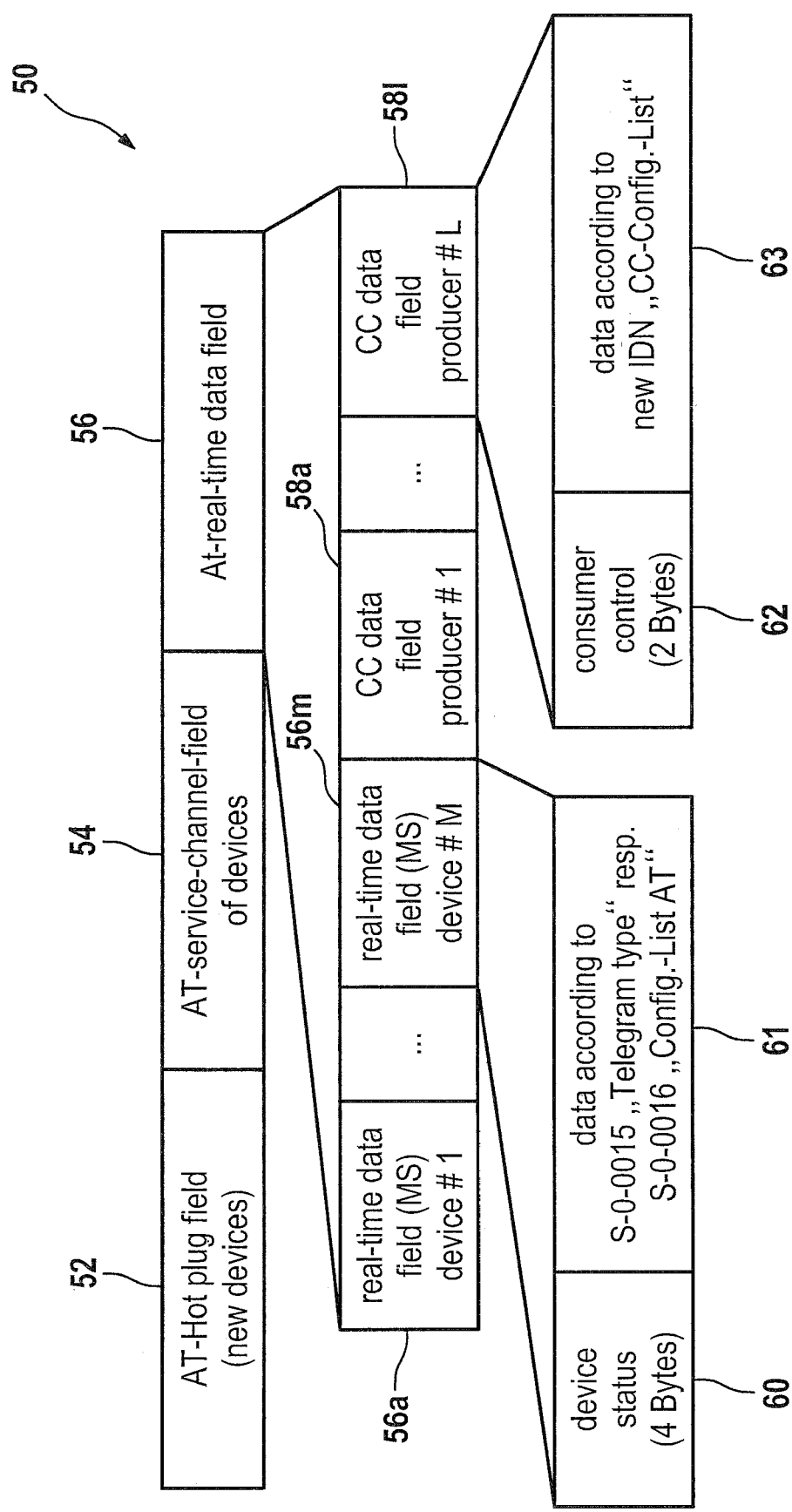
FIG. 2 shows a preferred telegram construction with which a communication according to the invention between primary stations and secondary stations as well as a cross communication between the secondary stations can be implemented.

Turning to FIG. 2, a preferred telegram construction will now be described. As already noted, the cross communication and reporting a data refreshment operation to the respective receiver or consumer are essential aspects of the invention.

It should also be noted that the corresponding data can be contained in telegrams of both the MDT and the AT type. A comprehensive data telegram type, in which characteristics of the MDT and AT types are combined, would also be suitable for this purpose.

The following telegram construction refers to a telegram of the AT type, which is preferred in this connection.

The telegram is identified overall in FIG. 2 by reference numeral 50. It has three fields, namely an AT hot plug field 52, an AT service channel field 54, and an AT real-time data field 56. The actual cyclically transmitted data, which are transmitted between the a primary station and the secondary stations, or among the individual secondary stations, are contained in the field 56.

The fields 52 and 54 contain administrative and logging data and will not be explained further here. It will merely be noted that in the AT service channel field 54, data can also be transmitted from one secondary station (slave) to the primary station (master).

The field 56 embodied as a real-time data field has a number of data fields 56a through 56m for data that are to be transmitted from the various secondary stations to the primary station. Expediently, one such data field is provided for each secondary station.

The field 56 furthermore has data fields 58a through 58l, which contain data for transmission among the secondary stations. Once again, for each individual cross communication, or in other words each transmission between two specific secondary stations, its own data field is expediently provided.

A telegram 10 of this kind is generated by the primary station and transmitted along the line 30 in one of the two data transmission directions. Here, each secondary station inserts its data, intended for the primary station, into the assigned data field 56 for it, and inserts data intended for a further secondary station into a corresponding data field 58.

It should be noted that the data fields 58a through 58e can represent either point-to-point communication or communication among a plurality of secondary stations or both. In the case of a point-to-point communication, one special data field is assigned to two secondary stations. It should be noted that in the event that a communication between two secondary stations takes place in both directions, two telegrams must be provided, which each have one field 58 for a data transmission between these two secondary stations. One of these telegrams is transmitted clockwise in terms of FIG. 1b, and the other of the telegrams is transmitted counterclockwise.

In the case of communication to a plurality of secondary stations, one field 58 is assigned for instance to a first secondary station 20 as the producer and to further secondary stations 22, 24, 26 as consumers.

Because, in a telegram of the AT type, all the AT data can be received at each secondary station (for instance, because of the bidirectional ring topology), each secondary station can receive the data directed to it.

For example, let it be assumed that one secondary station produces from 1 to n data blocks in the AT for cross communication. Each data block comprises from 1 to k individual values (such as an actual status value, actual instantaneous value, and so forth) and one administration field. This is shown in FIG. 2 for the data fields 56 and 58 by the respective fields 60, 61 and the fields 62, 63, respectively.

As an example, a realtime data field 56 has an administration field 60, in which refreshment of the corresponding values that are contained in the data field 61 is for instance signaled. With regard to the data fields 58, this can be realized by means of an administration field 62 and the data fields 63.

The signaling of a refreshment operation can be done for instance by means of a toggle bit. Expediently, a consumer or receiver of data in this case knows a corresponding refreshment cycle time. The communications cycle length is advantageously the longest common divisor of all the refreshment cycle times.

In this connection, three options with regard to the refreshment cycle times should be mentioned: First, it is possible to embody a refreshment cycle in a secondary station-specific way; that is, the refreshment cycle in one secondary station is identical for all the data or data fields 58 produced by that secondary station. Second, it is also possible to embody the refreshment cycle as producer-data-specific; that is, the refreshment cycle in one secondary station is optionally different for each data field 58 produced by that secondary station.

The possibility of synchronizing a plurality of producers (data-generating secondary stations) by means of a consumer (data-receiving secondary station) should also be pointed out, for instance in connection with office monitoring: By sending an inquiry or request using "toggling IPO", the corresponding data are sent by the producers.

In connection with office monitoring, it should be noted that multiple axes in combination must be considered here. That is, the monitoring requires current actual values from different producers at the same time. To that end, it can control the other producers in a targeted way, using its own data field that contains only a piece of request information.

It will be understood that each of the elements described above, or two or more together, may also find a useful application in other types of methods differing from the type described above.

While the invention has been illustrated and described as embodied in a method of operating a network, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A method for operating a network having a primary station and at least two secondary stations, comprising the steps of:

communicating the primary station with the at least two secondary stations, wherein said primary station is configured to operate as a master and wherein said at least two secondary stations are configured to operate as slaves of the master;

communicating the at least two secondary stations with one another to furnish a cross communication;

effecting the cross communication by telegrams which are generated in a context of communications cycles, wherein said telegrams comprise real time data fields;

generating said telegrams by the primary station, by one of the at least two secondary stations, or by both said primary station and said one of said at least two secondary stations;

implementing said communication via said real time data fields, wherein cyclically transmitted data transmitted between the primary station and said at least two secondary stations, among said at least two secondary stations, or between the primary station and said at least two secondary stations and among said at least two secondary stations are contained in said real time data fields, wherein said real time data fields simultaneously include a plurality of sub data fields for data that are transmitted from the at least two secondary stations to the primary station, wherein a separate and distinct sub data field is provided for each of said at least two secondary stations, and wherein the real time data fields further include a plurality of sub data fields that contain data for transmission among said at least two secondary stations; and signaling in a context of the communication between the secondary stations, a refreshment of cross-communication data to be exchanged, wherein the signaling of the refreshment of the cross-communication data is performed by secondary stations that produce said data, and activating a receiver of the secondary stations only in response to the signaling of the refreshment of the cross-communication data, such that the receiver of the secondary stations thereafter exchanges and receives data, wherein said network is a linked-together control or automation system network.

2. The method as defined in claim 1, wherein said effecting includes effecting the cross communication by telegrams which are generated by the primary station, at least one of the secondary stations, or both the primary station and the at least one of the secondary stations.

3. The method as defined in claim 1; and further comprising jointly transmitting the cross-communication data in the context of an existing data telegram.

4. The method as defined in claim 1; and further comprising embodying the cross-communication connections as logical point-to-point connections.

5. The method as defined in claim 1; and further comprising forming the cross-communication connections or including in them logic connections from one station to a plurality of other stations.

6. The method as defined in claim 1; and further comprising effecting the signaling in a context of an administration field of the telegram used.

7. The method in claim 1; and further comprising performing the signaling of the refreshment operation by an alternating bit (toggle bit).

8. The method in claim 1; and further comprising setting the signaling of the refreshment individually for at least one data field that is produced.

9. The method in claim 1; and further comprising providing that consuming or data-receiving secondary stations know the refreshment cycle times, refreshment times of the cross-communication data produced, or both the refreshment cycle times and the refreshment times of the cross-communication data produced.

10. The method in claim 1; and further comprising forming a refreshment cycle time as a multiple of the communications cycle time.

11. The method as defined in claim 1; and further comprising basing the method on Ethernet technology or SERCOS III technology.

12. The method as defined in claim 1; and further comprising transmitting the cross-communication data in a common data telegram with the communications data between the primary station and the at least two secondary stations, or between the at least two secondary stations and the primary station.

* * * * *